(12) United States Patent
Clark et al.

(10) Patent No.: US 8,230,417 B1
(45) Date of Patent: Jul. 24, 2012

(54) COMBINED APPLICATION AND EXECUTION ENVIRONMENT INSTALL

(75) Inventors: Jeremy R. Clark, San Rafael, CA (US);
Oliver Goldman, Redwood City, CA (US); Luis Polanco, San Jose, CA (US);
Christopher Brichford, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1412 days.

(21) Appl. No.: 11/760,685

(22) Filed: Jun. 8, 2007

(51) Int. Cl.
  *G06F 9/44* (2006.01)
  *G06F 9/445* (2006.01)
  *G06F 15/177* (2006.01)

(52) U.S. Cl. .................... 717/174; 717/168; 709/220

(58) Field of Classification Search .................. None
  See application file for complete search history.

(56) References Cited

U.S. PATENT DOCUMENTS

| | | | |
|---|---|---|---|
| 5,157,763 A | 10/1992 | Peters et al. |
| 5,301,268 A | 4/1994 | Takeda |
| 5,555,416 A | 9/1996 | Owens et al. |
| 5,606,674 A | 2/1997 | Root |
| 5,625,809 A | 4/1997 | Dysart et al. |
| 5,694,563 A | 12/1997 | Belfiore et al. |
| 5,781,192 A | 7/1998 | Kodimer |
| 5,784,058 A | 7/1998 | LaStrange et al. |
| 5,801,693 A | 9/1998 | Bailey |
| 5,835,777 A | 11/1998 | Staelin |
| 5,860,012 A | 1/1999 | Luu |
| 5,886,699 A | 3/1999 | Belfiore et al. |
| 5,924,099 A | 7/1999 | Guzak et al. |
| 5,999,740 A | 12/1999 | Rowley |
| 6,009,274 A | 12/1999 | Fletcher et al. |
| 6,028,965 A | 2/2000 | Normile |

(Continued)

FOREIGN PATENT DOCUMENTS

WO  WO0043913  7/2000

(Continued)

OTHER PUBLICATIONS

Xiaorong Xiang, Service-Oriented Architecture for Integration of Bioinformatic Data and Applications [online], Apr. 2007, retrieved on Mar. 15, 2012, pp. 44-72. Retrieved from Internet: <URL: http://www.nd.edu/~mog/Papers/xiaorong_phd.pdf>.*

(Continued)

*Primary Examiner* — Thuy Dao
*Assistant Examiner* — Hanh T Bui
(74) *Attorney, Agent, or Firm* — Fish & Richardson P.C.

(57) ABSTRACT

Methods, systems, and apparatus, including medium-encoded computer program products, for installing software, including application execution environments, on a computer. One or more aspects of the subject matter described in this specification can be embodied in one or more methods that include receiving a request to provide for installation of a software application on a target computer, where the software application requires for operation an application execution environment program including a cross-platform application program interface to provide services to applications that run in the application execution environment; and providing installation of both the software application and the application execution environment program in an installation sequence when the target computer lacks the application execution environment program; wherein the installation of the software application and the application execution environment program are tied together as a single installation transaction, such that they succeed or fail together.

26 Claims, 9 Drawing Sheets

U.S. PATENT DOCUMENTS

| | | | |
|---|---|---|---|
| 6,043,816 A * | 3/2000 | Williams et al. | 715/783 |
| 6,061,058 A | 5/2000 | Owens et al. | |
| 6,067,582 A | 5/2000 | Smith et al. | |
| 6,125,388 A | 9/2000 | Reisman | |
| 6,199,204 B1 | 3/2001 | Donohue | |
| 6,202,207 B1 | 3/2001 | Donohue | |
| 6,216,152 B1 | 4/2001 | Wong et al. | |
| 6,272,493 B1 | 8/2001 | Pasquali | |
| 6,301,710 B1 | 10/2001 | Fujiwara | |
| 6,314,565 B1 | 11/2001 | Kenner et al. | |
| 6,321,209 B1 | 11/2001 | Pasquali | |
| 6,374,401 B1 | 4/2002 | Curtis | |
| 6,378,128 B1 | 4/2002 | Edelstein et al. | |
| 6,385,766 B1 * | 5/2002 | Doran et al. | 717/174 |
| 6,418,555 B2 | 7/2002 | Mohammed | |
| 6,434,563 B1 | 8/2002 | Pasquali et al. | |
| 6,496,979 B1 * | 12/2002 | Chen et al. | 717/178 |
| 6,535,882 B2 | 3/2003 | Pasquali | |
| 6,536,040 B1 * | 3/2003 | Curtis | 717/174 |
| 6,539,539 B1 | 3/2003 | Larsen et al. | |
| 6,546,554 B1 | 4/2003 | Schmidt et al. | |
| 6,557,054 B2 | 4/2003 | Reisman | |
| 6,601,236 B1 * | 7/2003 | Curtis | 717/177 |
| 6,606,744 B1 | 8/2003 | Mikurak | |
| 6,618,857 B1 * | 9/2003 | Zimniewicz et al. | 717/175 |
| 6,629,316 B1 * | 9/2003 | Curtis | 717/174 |
| 6,636,856 B2 | 10/2003 | Pasquali | |
| 6,651,249 B2 | 11/2003 | Waldin et al. | |
| 6,654,765 B2 | 11/2003 | Wong et al. | |
| 6,658,419 B2 | 12/2003 | Pasquali | |
| 6,687,745 B1 | 2/2004 | Franco et al. | |
| 6,748,591 B1 | 6/2004 | Lewallen | |
| 6,757,365 B1 | 6/2004 | Bogard | |
| 6,785,885 B2 | 8/2004 | Norris et al. | |
| 6,803,929 B2 | 10/2004 | Hinegardner et al. | |
| 6,839,714 B2 | 1/2005 | Wheeler et al. | |
| 6,874,142 B1 | 3/2005 | Ogura | |
| 6,904,569 B1 | 6/2005 | Anderson | |
| 6,944,821 B1 | 9/2005 | Bates et al. | |
| 6,948,166 B2 | 9/2005 | Barfield et al. | |
| 6,961,907 B1 | 11/2005 | Bailey | |
| 7,032,220 B2 * | 4/2006 | Curtis | 717/174 |
| 7,080,139 B1 | 7/2006 | Briggs et al. | |
| 7,085,817 B1 | 8/2006 | Tock et al. | |
| 7,127,405 B1 | 10/2006 | Frank et al. | |
| 7,263,545 B2 | 8/2007 | Digate et al. | |
| 7,275,243 B2 | 9/2007 | Gibbons et al. | |
| 7,287,097 B1 | 10/2007 | Friend et al. | |
| 7,293,242 B2 | 11/2007 | Cossey et al. | |
| 7,296,244 B2 | 11/2007 | Martinez et al. | |
| 7,299,259 B2 | 11/2007 | Petrovykh | |
| 7,305,453 B2 | 12/2007 | Awamoto et al. | |
| 7,310,781 B2 | 12/2007 | Chen et al. | |
| 7,337,210 B2 | 2/2008 | Barsness | |
| 7,340,512 B2 * | 3/2008 | Cochran et al. | 709/220 |
| 7,370,278 B2 | 5/2008 | Malik et al. | |
| 7,383,308 B1 | 6/2008 | Groves et al. | |
| 7,383,356 B2 | 6/2008 | Gargi | |
| 7,386,841 B2 | 6/2008 | Huang et al. | |
| 7,395,500 B2 | 7/2008 | Whittle et al. | |
| 7,409,405 B1 | 8/2008 | Masinter et al. | |
| 7,434,048 B1 | 10/2008 | Shapiro et al. | |
| 7,451,218 B2 | 11/2008 | Malik et al. | |
| 7,478,336 B2 | 1/2009 | Chen et al. | |
| 7,505,998 B2 | 3/2009 | Barrett | |
| 7,617,458 B1 | 11/2009 | Wassom et al. | |
| 7,664,834 B2 | 2/2010 | Keith, Jr. | |
| 7,698,698 B2 * | 4/2010 | Skan | 717/168 |
| 7,711,771 B2 | 5/2010 | Kirnos | |
| 7,752,574 B2 | 7/2010 | Dere | |
| 7,793,281 B2 | 9/2010 | Goring et al. | |
| 7,797,403 B2 * | 9/2010 | Vedula et al. | 709/220 |
| 7,814,476 B2 | 10/2010 | Ho | |
| 7,907,966 B1 * | 3/2011 | Mammen | 455/557 |
| 2001/0034244 A1 | 10/2001 | Calder et al. | |
| 2002/0049633 A1 | 4/2002 | Pasquali | |
| 2002/0055975 A1 | 5/2002 | Petrovykh | |
| 2002/0069264 A1 | 6/2002 | Pasquali | |
| 2002/0080179 A1 | 6/2002 | Okabe et al. | |
| 2002/0103902 A1 | 8/2002 | Nagel et al. | |
| 2002/0122068 A1 | 9/2002 | Tsuruoka | |
| 2003/0037327 A1 | 2/2003 | Cicciarelli et al. | |
| 2003/0037328 A1 | 2/2003 | Cicciarelli et al. | |
| 2003/0050932 A1 | 3/2003 | Pace et al. | |
| 2003/0163807 A1 | 8/2003 | Drake et al. | |
| 2003/0187929 A1 | 10/2003 | Pugh et al. | |
| 2003/0208491 A1 | 11/2003 | Pasquali | |
| 2004/0088694 A1 | 5/2004 | Ho | |
| 2004/0093563 A1 | 5/2004 | Pasquali | |
| 2004/0111478 A1 | 6/2004 | Gross et al. | |
| 2004/0143633 A1 | 7/2004 | McCarty | |
| 2004/0194082 A1 | 9/2004 | Purkeypile et al. | |
| 2004/0205134 A1 | 10/2004 | Digate et al. | |
| 2004/0230967 A1 | 11/2004 | Yuknewicz et al. | |
| 2004/0243997 A1 | 12/2004 | Mullin et al. | |
| 2004/0267804 A1 | 12/2004 | Fresko et al. | |
| 2005/0021652 A1 | 1/2005 | McCormack | |
| 2005/0044191 A1 | 2/2005 | Kamada et al. | |
| 2005/0044545 A1 | 2/2005 | Childress et al. | |
| 2005/0049960 A1 | 3/2005 | Yeager | |
| 2005/0066019 A1 | 3/2005 | Egan et al. | |
| 2005/0086290 A1 | 4/2005 | Joyce et al. | |
| 2005/0086640 A1 | 4/2005 | Kolehmainen et al. | |
| 2005/0097061 A1 | 5/2005 | Shapiro et al. | |
| 2005/0108369 A1 * | 5/2005 | Sather et al. | 709/220 |
| 2005/0172241 A1 | 8/2005 | Daniels et al. | |
| 2005/0198581 A1 | 9/2005 | Soderberg et al. | |
| 2005/0203892 A1 | 9/2005 | Wesley et al. | |
| 2005/0210401 A1 | 9/2005 | Ketola et al. | |
| 2005/0257128 A1 | 11/2005 | Pasquali et al. | |
| 2005/0262521 A1 | 11/2005 | Kesavarapu | |
| 2006/0025091 A1 | 2/2006 | Buford | |
| 2006/0026590 A1 | 2/2006 | Berenberg et al. | |
| 2006/0047946 A1 | 3/2006 | Keith, Jr. | |
| 2006/0048130 A1 | 3/2006 | Napier et al. | |
| 2006/0048140 A1 | 3/2006 | Boctor et al. | |
| 2006/0070063 A1 * | 3/2006 | Takashige et al. | 717/174 |
| 2006/0085796 A1 | 4/2006 | Hoerle et al. | |
| 2006/0095524 A1 | 5/2006 | Kay et al. | |
| 2006/0168575 A1 * | 7/2006 | Bhatt et al. | 717/168 |
| 2006/0212329 A1 | 9/2006 | Lucas et al. | |
| 2006/0271526 A1 | 11/2006 | Charnock et al. | |
| 2007/0038993 A1 * | 2/2007 | Corpening et al. | 717/174 |
| 2007/0220510 A1 * | 9/2007 | Bell et al. | 717/174 |
| 2007/0234344 A1 * | 10/2007 | Hamid et al. | 717/174 |
| 2008/0127169 A1 * | 5/2008 | Malasky et al. | 717/174 |
| 2008/0127170 A1 * | 5/2008 | Goldman et al. | 717/174 |
| 2008/0127175 A1 * | 5/2008 | Naranjo et al. | 717/174 |
| 2008/0141241 A1 * | 6/2008 | Mills | 717/174 |
| 2008/0244589 A1 | 10/2008 | Darnell et al. | |
| 2009/0019436 A1 * | 1/2009 | Hartz et al. | 717/178 |
| 2009/0037835 A1 | 2/2009 | Goldman | |
| 2011/0072424 A1 * | 3/2011 | Choi et al. | 717/174 |

FOREIGN PATENT DOCUMENTS

| | | |
|---|---|---|
| WO | WO0049545 | 8/2000 |

OTHER PUBLICATIONS

G. Denys et al., A Survey of Customizability in Operating Systems Research [online], Dec. 2002, retrieved on Mar. 15, 2012, pp. 450-468. Retrieved from Internet: <URL:http://delivery.acm.org/10.1145/600000/592644/p450-denys.pdf?>.*

Lambert, Karine, Authorized Officer, European Patent Office, in International Search Report for Application Serial No. PCT/US2008/066184, mailed Nov. 6, 2008, 15 pages, to be published by USPTO.

Lambert, Karine, Authorized Officer, European Patent Office, in International Search Report for Application Serial No. PCT/US2008/066188, mailed Nov. 6, 2008, 15 pages, to be published by USPTO.

Oliver Goldman, et al., Application Execution and Installation Environment, U.S. Appl. No. 11/760,674, filed Jun. 8, 2007, 36 pages, to be published by USPTO.

Muller, Nathan J., "Focus on OpenView," Chapters 8, 9 and 10 (Mar. 1995), 73 pages.

Netscape 7.1 Upgrade Guide, 8 pages (2003), 8 pages.

RealPresenter™ Plug-in for use with Microsoft® PowerPoint® 97, User's Guide Version 5.0, Real Networks, Inc., (1998), 29 pages.

Sun Microsystems, Inc., Java™ Network Launching Protocol & API Specification (JSR-56) Version 1.5 [Online] May 2001, XP007906066. Retrieved from the Internet: URL:http://cds.sun.com/is-bin/INTERSHOP.enfinity/WFS/CDS-CDS_Developer-Site/en_US/-/USD/VerifyItem-Start/jnlp-1_5-mr-spec.pdf?BundledLineItemUUID=gvVIBe.pDpoAAAEdPR1iMS9Y&OrderID=0Q51Be.pB8IAAAEdMB1iMS9Y&ProductID=fL_ACUFB1v0AAAEY2U45AXuV&FileName=/jnlp-1_5-mr-spec.pdf> (Retrieved on Nov. 24, 2008), 85 pages.

Sun Microsystems, Inc., "Auto Downloading JREs using Java™ Web Start and Java™ Plug-in" [Online] Feb. 2007, pp. 1-3, XP007906067. Retrieved from the Internet: URL: http://web.archive.org/web/20070207051627/http://java.sun.com/j2se/1.5.0/docs/guide/javaws/developersguide/autodl.03.06.html> (Retrieved on Nov. 24, 2008), 3 pages.

Sun Microsystems, Inc., Packaging JNLP Applications in a Web Archive, Java™ Web Start 1.4.2 [Online] Aug. 2005, pp. 1-11, XP007906068. Retrieved from the Internet: URL:http://web.archive.org/web/20050828081147/http://java.sun.com/j2se/1.4.2/dosc/guide/jws/downloadservletguide.html> (Retrieved on Nov. 24, 2008), 11 pages.

Corporate Portals Letter, vol. 1, No. 10, Oct. 2000, 3 pages.

Kolehmainen et al., U.S. Appl. No. 60/513,050, titled: Systems and Methods for Facilitating Software Development and Communications Efficacy, filed Oct. 21, 2003, 39 pages.

Windley, Phillip J., "REST: Representational State Transfer," Chapter 11, Mar. 22, 2005, pp. 237-261.

\* cited by examiner

COMBINED APPLICATION AND EXECUTION ENVIRONMENT INSTALL

CROSS-REFERENCE TO RELATED APPLICATIONS

This application is related to U.S. patent application Ser. No. 11/760,674, entitled APPLICATION EXECUTION AND INSTALLATION ENVIRONMENT, filed on Jun. 8, 2007, which is hereby incorporated by reference.

BACKGROUND

This specification relates to installing software, including application execution environments (e.g., virtual machines and runtime environments), on a computer platform. A computer platform is a computer including a particular operating system (OS) for that computer (e.g., WINDOWS® OS, MAC® OS, or LINUX® OS). Software developers often create source code that can be appropriately compiled for respective computer platforms, and then independently generate native installation packages for each target platform. Each native installation package is associated with a specific computer platform, and these native installation packages can then be distributed for installation on appropriate machines. For a particular target platform, the appropriate native installation package is obtained from the software developer, and an OS installer can be used to process the native installation package in order to install the application. For example, INSTALLSHIELD® software can be used to produce an .msi file for installation on WINDOWS® machines, and a different software tool can be used to produce .pkg files for installation on MAC® machines.

Some software developers have created cross-platform installation packages, such as the JAVA® Archive (JAR) file format, that get deployed to the end-user system. The cross-platform package can then be expanded (e.g., decrypted and uncompressed) and written directly to disk using code provided by the software developer and/or the developer of the cross-platform package format. Typically, such cross-platform software relies on a previously installed virtual machine, such as the JAVA® Virtual Machine (JVM) (available from Sun Microsystems, Inc.), to run on the target platform.

The JVM provides a runtime environment and Java interpreter for most operating systems, including WINDOWS® OS, MAC® OS, AND LINUX® OS. Java source code files (files with a .java extension) are compiled into a format called bytecode (files with a .class extension), which can then be executed by a Java interpreter. Bytecode can be converted directly into machine language instructions by a just-in-time compiler (JIT). Other example runtime environments include the C runtime, .NET, and the Adobe® Integrated Runtime.

Flash® Player (available from Adobe Systems Incorporated) is another virtual machine, which is used to run, or parse, Flash® files including ActionScript or Shockwave Flash (SWF). The Flash® Player and Flash® Authoring software allow development of projectors (self-running SWF movies) that run on a specific target platform, by embedding the SWF data in the Flash® Player executable to create a new .exe file, and manipulating a byte pattern in the .exe file to indicate the presence of the SWF data. Such projectors can then be distributed for use on the target platform.

Traditionally, runtimes and their installers have been developed separately. Often, the installation engine for a runtime is acquired or licensed from a third party. An installer for a runtime contains its own user interface and other facilities for interacting with the OS of the target computer platform. In addition, applications that require a runtime to be installed before they can be used have to let the user know about this prerequisite. In the network download context, typically the user is required to download and install the runtime first as a separate process, and then re-start the application install process. Alternatively, the two installers (one for the runtime and one for the application) can be chained together such that, even though the application install process re-starts automatically, the user still sees two separate series of installation dialogs.

SUMMARY

This specification describes technologies relating to installing software, including application execution environments (e.g., virtual machines and runtime environments), on a computer platform.

In general, one or more aspects of the subject matter described in this specification can be embodied in one or more methods that include receiving a request to provide for installation of a software application on a target computer, where the software application requires for operation an application execution environment program including a cross-platform application program interface to provide services to applications that run in the application execution environment; and providing installation of both the software application and the application execution environment program in an installation sequence when the target computer lacks the application execution environment program; wherein the installation of the software application and the application execution environment program are tied together as a single installation transaction, such that they succeed or fail together. Other embodiments of this aspect include corresponding systems, apparatus, and computer program products.

These and other embodiments can optionally include one or more of the following features. The providing can include providing an initial installation user interface panel relating to the software application upon first initiation of the installation sequence. The installation sequence can include a user interface panel, presented to a user, that includes a notification regarding the application execution environment program to be installed along with the software application. Moreover, the providing can include providing the user interface panel for presentation to the user and collection of install preferences for the software application installation, wherein the notification includes an indication that the application execution environment program installation is required for the software application installation.

The installation sequence can include: an installation user interface panel to receive confirmation that the user wants to install the software application; the user interface panel that includes the notification regarding the application execution environment program to be installed along with the software application; a license agreement user interface panel to receive acceptance of a user license agreement for the application execution environment program; and an install process user interface panel to present progress of the installation of both the software application and the application execution environment program using a single progress indicator that spans the installation of both the software application and the application execution environment program.

The providing can include: starting a first installer of the application execution environment program with a reference to an installation package of the software application; calling a second installer, for the installation package, from the first installer with an indication that the application execution environment program is to be installed; presenting, by the second installer, the user interface that includes the inserted notification; and after user acceptance of the license agreement for the application execution environment program, installing the application execution environment program and then the software program. Moreover, the installing can include the second installer driving the application execution environment program then the software program installs transactionally as one install using an install progress bar that spans the installs.

The providing can include providing an installer package, including the application execution environment program and an installer, to the target computer to install the application execution environment program and the software application by running the installer in the application execution environment copied to the target computer. Additionally, one or more computers, operable to interact with the target computer to perform these operations, can include a server operable to interact with the target computer through a data communication network, and the target computer can be operable to interact with the server as a client. Moreover, the target computer can include a personal computer running a web browser (e.g., a desktop computer) or a mobile communication device running a wireless application protocol browser (e.g., a mobile phone).

Particular embodiments of the subject matter described in this specification can be implemented to realize one or more of the following advantages. A runtime (or more generally a software program) can contain its own installation logic. The runtime can make use of its own user interface and other facilities during its own installation. An installer for the runtime can operate from within the runtime being installed. The size of the installer can be reduced, since a full fledged installation engine need not be used, and this can in turn result in reduced download size for the installer-runtime combination (only a single copy of the runtime need be transmitted). Since the installer can presume that the runtime will be available to provide user interface and other facilities, the installer does not need to duplicate facilities available in the runtime itself, thus reducing the overall size of the runtime and installer package. Installation success rates can be increased. User interfaces for installation can be embedded in the runtime and used by the installer such that installs can have the same look and feel across both runtime and application installs. Moreover, the installer can provide its own look and feel for the install by providing user interface code that runs on the runtime to produce the user interface(s) for installation.

A single copy of a runtime can be used in two ways. First, the installer itself can run on top of the copy of the runtime included in an installation package. Second, the logic in the installer can use that same copy of the runtime as the source for installing the runtime on a target computer. An installer can operate on a runtime on a target computer that is not yet installed on the target computer. The installer can be built into the runtime it is installing. The runtime can be designed to run in two different modes: an installed mode (where the runtime is registered at a specific location) and an x-copy mode (where the runtime executable can be run directly from disk without registering through the OS). The runtime can be executed in x-copy mode to install the runtime in the installed mode. Thus, the runtime can essentially install itself.

Furthermore, a software application and the runtime on which the application depends (neither of which have yet been installed on a target computer) can be installed to the target computer in a combined workflow. The combined workflow can guide the user through a single install process, installing both the application and the runtime, with a minimum number of interactions. The two installations (of the runtime and the application that depends on the runtime) can be combined, on the fly, into a single unified installation sequence, where both the installation process and the install user interface are combined for the application and the runtime. The ease of installation and usability can be improved, making the installation process more streamlined and less confusing for the user, which can result in high success rates since more users are likely to complete the installation process rather than change their mind midstream. Thus, the burden on the user to get the runtime installed can be effectively minimized. Moreover, the installation of the application and the runtime on which the application depends can be interleaved.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
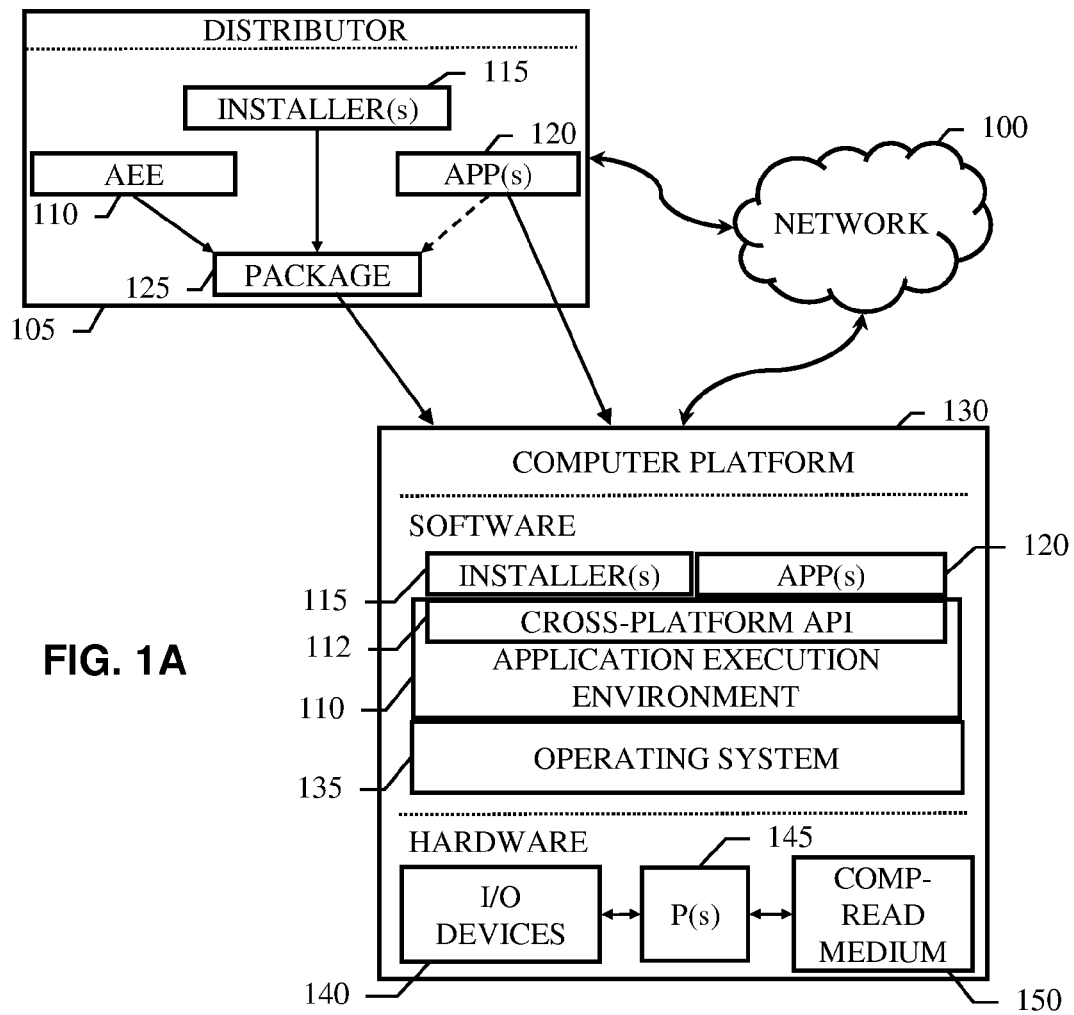
FIG. 1A shows an example system for software distribution and installation.

FIG. 1A shows an example system for software distribution and installation. A distributor 105 can provide an application execution environment (AEE) program 110, one or more installers 115 and one or more software applications 120 to be installed on a target computer 130. The distributor 105 makes an installer package 125 available for use installing one or more software programs on the computer 130. The installer package 125 can include an AEE installer and the AEE program. In addition, the installer package 125 can include one or more applications 120, or references to such, for installation along with the application execution environment program 110.

The distributor 105 can be a software developer, publisher, reseller, or other entity which distributes software, or the computers used by such. For example, the distributor 105 can be a server or server cluster providing software download facilities over a network 100, such as Local Area Networks, peer to peer networks, wireless networks, the Internet and the World Wide Web. The installer package 125 can also be distributed on physical media, such as Compact Discs (CDs), Digital Versatile Discs (DVDs) and floppy disks, or by other techniques that can be used to deliver digital content.

The target computer 130 includes both hardware and software. The hardware includes input/output devices 140, one or more processors 145 and at least one computer readable medium 150 (e.g., memory device(s), a storage device(s), or combinations of one or more of them). The software can include an operating system 135 on which the software elements provided by the distributor 105 operate. The application execution environment 110 uses the operating system 135 to interact with other elements of the computer 130. The application execution environment 110 can provide various utility services for use by applications that run in the application execution environment. These utility services can include file system access, window and menuing, integration with the OS shell (e.g., WINDOWS® OS Explorer or MAC® OS Finder), file extension registration, document processing support (e.g., HTML and PDF engines), string manipulation, graphics, networking, notification facilities, addressing peripherals, or other types of functionality that can be provide using a runtime library. Moreover, the application execution environment 110 can include a cross-platform application program interface (API) 112 that provides services to applications that run in the application execution environment and serves to abstract away details of the various hardware and OS platforms on which the application execution environment program 110 has been designed to run.

Thus, the application execution environment (AEE) 110 can be a cross-platform runtime environment, such as the Adobe® Integrated Runtime (AIR™) software, provided by Adobe Systems Inc. of San Jose, Calif. In some implementations, the application execution environment 110 can load an application from an encoded representation of the application. For example, the encoded representation can have a predefined syntactic structure such as a programming language (e.g., source code) or can include well defined virtual instructions (e.g., platform-independent bytecode, such as Macromedia Flash® bytecode). To load such applications, the application execution environment 110 can decode the encoded representation of the application into instructions and can execute the instructions of the application.

In addition to serving as an application execution environment, the AEE 110 can also serve as an application installation environment, both for itself and the applications 120 that run on the AEE 110. The user interface and language facilities of the AEE 110 (e.g., HTML, MXML (Multimedia eXtensible Markup Language), and scripting support, such as for ActionScript and JavaScript) can be used when writing the installer 115 (for the AEE 110, an application 120, or a combination of them). This can help in reducing the size of the installer, since much of the programming logic that would normally be needed in the installer 115 can be incorporated into the AEE 110.

The extent of the install/uninstall facilities to be put into the AEE 110 can vary among implementations. In some cases, the AEE 110 can provide APIs that perform all installation operations, based on requests from one or more appropriate installers. In other cases, some installation operations can be provided in the one or more installers, and lower level API's of the runtime (e.g., file system access API) can be used complete the installation operations on the computer 130.

Figure 2A:
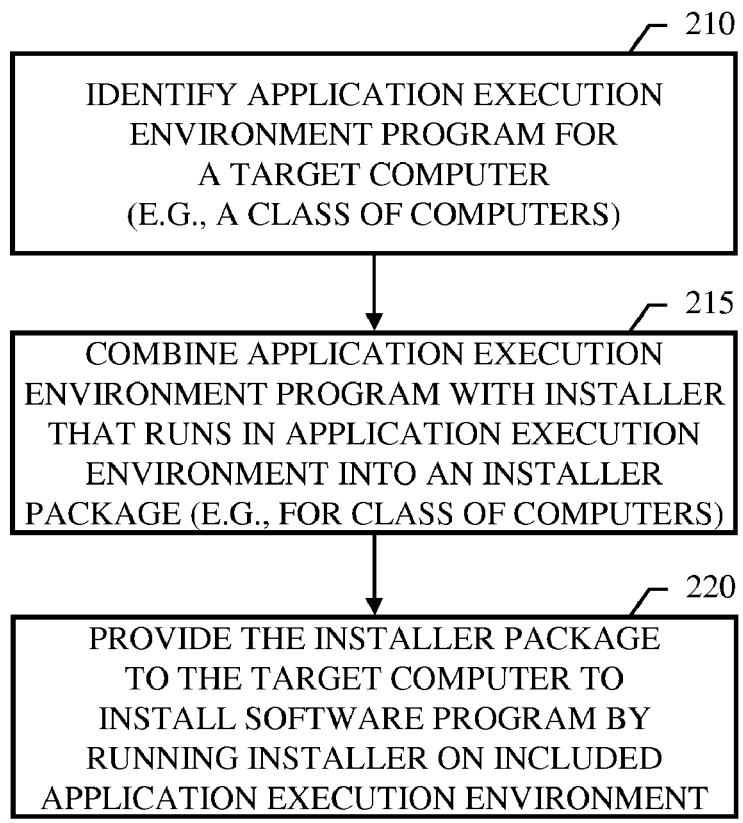
FIG. 2A shows an example process of provisioning an installer package with an application execution environment and an installer that runs in the application execution environment.

FIG. 2A shows an example process of provisioning an installer package with an application execution environment and an installer that runs in the application execution environment. An application execution environment program can be identified 210 for a target computer. This can involve determining the application execution environment program for a class of target computers, of which the target computer 130 is a member. For example, the classes of target computers can include those running WINDOWS® OS, those running MAC® OS, and those running LINUX® OS. A specific application execution environment program (which includes appropriate native, platform-specific code for the target computer platform) can then be prepared for use with each class of target computers.

The identified application execution environment program can be combined 215 with an installer for a software program into an installer package. This combining can also be specific to a class of computers; thus, the identifying and the combining can be performed for each target class of computers to prepare an installer package for each target class, which can be provided separately to each target computer that is a member of the class. Alternatively, the identifying and the combining can be performed dynamically for each target computer, such as when the installer sent needs to be specific to the target computer for digital rights management (DRM) purposes.

The installer itself runs in the application execution environment, and the installer package can be provided 220 to the target computer to install the software program by running the installer in the application execution environment copied to the target computer. As shown in FIG. 1A, the installer 115 runs on top of the application execution environment 110 in a manner similar to application(s) 120 designed to run in the application execution 110.

Figure 1B:
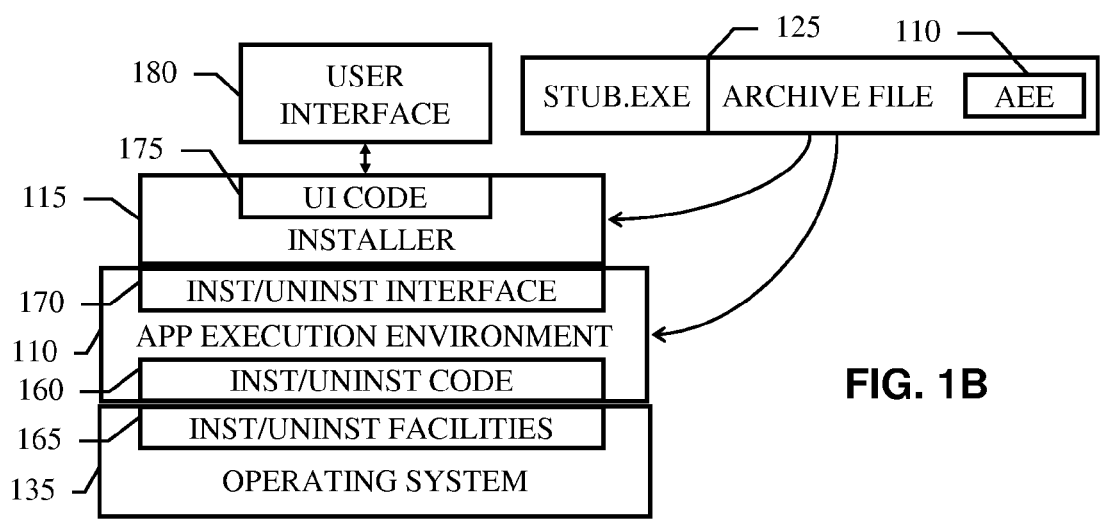
FIG. 1B shows example elements that can be used to install an application execution environment.

FIG. 1B shows example elements that can be used to install an application execution environment. The installer package 125 can include a compressed archive file (e.g., a Zip file) into which a single copy of the AEE has been packaged. In addition, this compressed archive file can be added to a self-extracting executable stub (stub.exe) to form the installer package 125 (e.g., for use with WINDOWS® OS based computers). Upon execution, the self-extractor code in the executable stub can unarchive the AEE to a temporary location. The AEE has been designed so that it can be run in place, i.e., without requiring an installation step other than simply copying files. Thus, the extracted copy of the AEE is immediately useable for running the installer.

In the example described in connection with FIG. 1B, the installer package 125 can itself be considered an installer, since the package 125 is an executable that begins the installation process. In other situations, the installer package 125 can be a compressed archive file itself. For example, for MAC® OS computers, the installer package 125 can be a ".dmg" file in disk image format. In this case, the user can open the .dmg file (e.g., double click it) and then launch the AEE installer included therein. Moreover, the installer package 125 can include one or more additional installers, as discussed further below.

In any event, the application execution environment program 110 can include installation/uninstallation code 160 for installing software to the target computer 130, the cross-platform application program interface 112 can include an install/uninstall interface 170 to the installation/uninstallation code 160, and the installer 115 can include user interface code 175. When the installer 115 is run in the AEE 110 on the target computer, the installer 115 can employ the install interface 170 of the AEE 110 to effect installation of the software program (e.g., the AEE 110 itself), and the installer 115 can employ the user interface code 175 (e.g., HyperText Markup Langauge, ActionScript or SWF code), which can also be run using the AEE 110, to generate and present a user interface 180 for the installation process.

For example, the installer 115 can contain a user interface that has been written using Adobe® Flex™ software, Flash® code or ActionScript code (or a combination of these), where this user interface (UI) communicates with logic that is embedded in the AEE 110. The name of the main class in the AEE 110 (for this purpose) can be "runtime installer", and an instance of the runtime installer can be created, some properties can be set on this instance, and then the runtime installer can be started. The runtime installer can then dispatch events, as the install proceeds, to report on progress (e.g., what percentage has been installed, if something has gone wrong, and so forth). These events can be captured by the code in the installer 115, which causes the UI to be updated. Note that communications going in both directions can be implemented using events. Thus, when the user accepts an end user license agreement for the AEE 110 (as discussed further below), an event can be sent from the UI to the runtime installer class, telling it to proceed with the installation. Then, progress events can come back the other way and cause the progress bar to be updated.

When the installer 115 is run in the AEE 110 on the target computer, the installer 115 can also cause placement of an uninstaller on the target computer, wherein the uninstaller runs in the AEE 110. The uninstaller can be another copy of the AEE 110 plus code that runs on top of it (e.g., Flex™ code). Thus, the installer can employ the install interface 170 to effect installation of the AEE 110, and the uninstaller can employ the uninstall interface 170 to effect uninstallation of the AEE 110. Furthermore, the installation/uninstallation code 160 in the AEE 110 can be designed to operate directly on the target computer to perform install and uninstall tasks (e.g., in a Mac® OS based computer), or the installation/uninstallation code 160 can be designed to interface with install/uninstall facilities 165 provided by the OS 135 (e.g., the Windows® Installer APIs in a Windows® OS based computer).

In the example presented above, the runtime installer class can have very different implementations on a Mac® OS based computer versus a Windows® OS based computer. On a Windows® OS based computer, the runtime installer can operate using API(s) that are in the AEE 110 and that are related only to installation because they use the Windows® installation services to perform the installation operations. On a Mac® OS based computer or a Linux® OS based computer, the runtime installer can operate using the file system API(s) that are in the AEE 110. In any event, the runtime installer class can define a cross-platform interface that the installer(s) 115 can access and use in the same manner, regardless of whether it is running on a Mac® OS based computer or a Windows® OS based computer (i.e., the installer 115 need not have any native code in it). Other approaches are also possible. For example, the AEE 110 can provide a mechanism for invoking native code, and this mechanism can also be used by the installer 115.

Figure 2B:
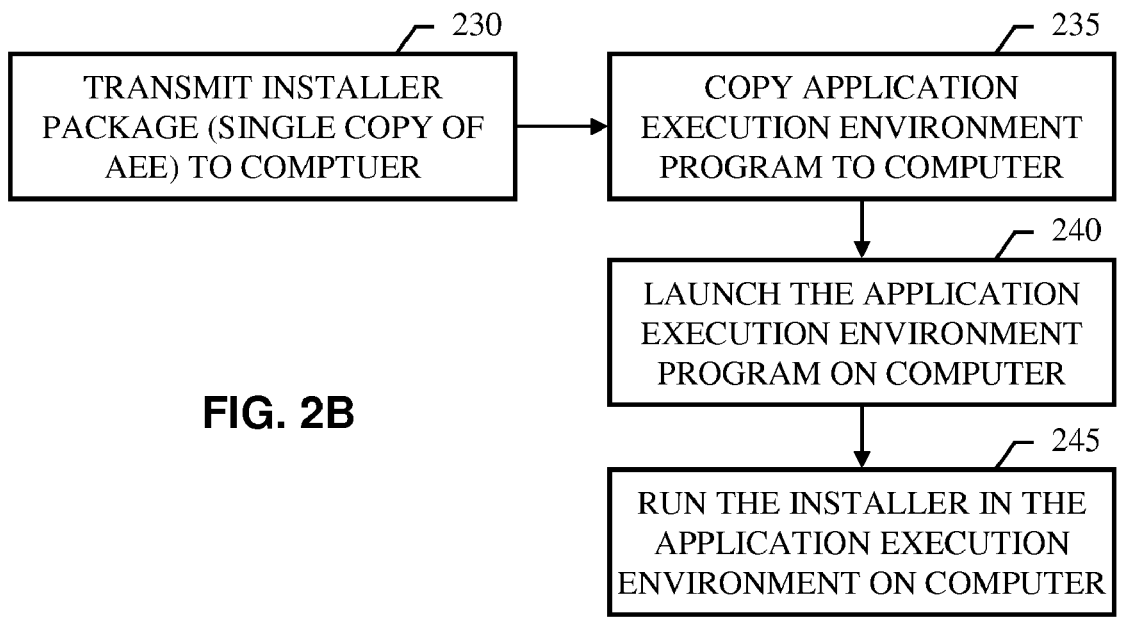
FIG. 2B shows an example process of installing an application execution environment program to a target computer.

FIG. 2B shows an example process of installing an application execution environment program to a target computer. The installer package can be transmitted 230 to the target computer to cause the target computer to perform install operations when the installer package is invoked (e.g., when the installer package executable is executed). The application execution environment program can be copied 235 to the target computer. This can involve extracting the application execution environment program to the target computer from a compressed archive file, after which, the application execution environment is useable for running the installer. The application execution environment program can be launched 240 on the target computer in x-copy mode. The installer can be run 245 in the launched application execution environment on the target computer before the application execution environment program has been installed on the target computer (i.e., it is running in x-copy mode). The installer can present a user interface, including various UI panels, to the user (such as described further below) and can make a second copy of the application execution environment program (directly from the running copy) to its final install location.

Figure 2C:
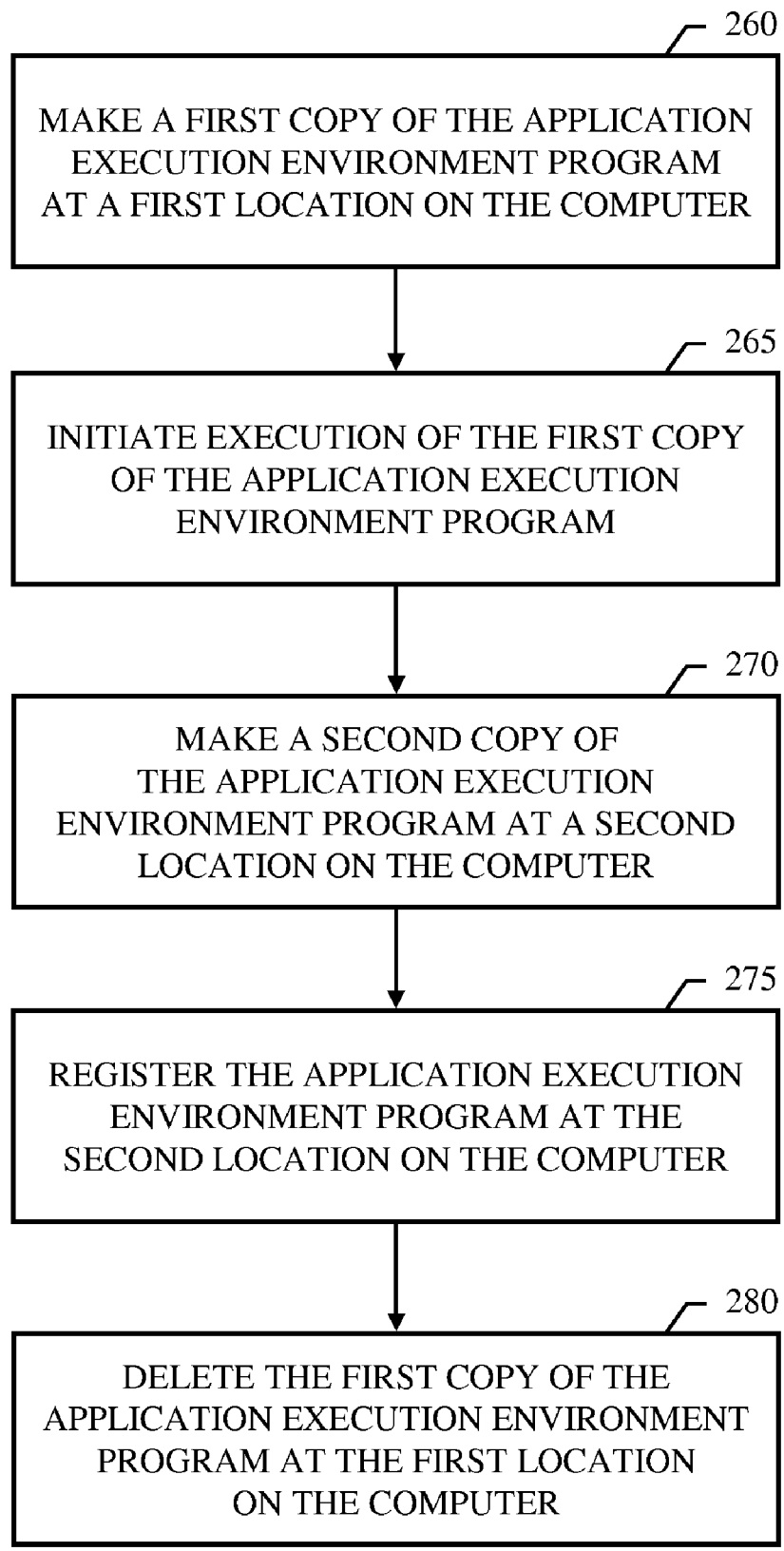
FIG. 2C shows another example process of installing an application execution environment program to a target computer.

FIG. 2C shows another example process of installing an application execution environment program to a target computer. A first copy of the application execution environment program can be made 260 at a first location on the target computer. This can be an executable copy of the application execution environment program that has been downloaded to a temporary directory, where it can be run before the installation has been completed. Execution of the first copy of the application execution environment program can be initiated 265.

A second copy of the application execution environment program can be made 270 at a second location on the target computer. The application execution environment program can be registered 275 at the second location on the target computer. This can involve registering file extensions and MIME (Multipurpose Internet Mail Extensions) content types, registering instructions for uninstallation, creating desktop shortcuts and start menu entries, etc. The first copy of the application execution environment program can be deleted 280 at the first location on the target computer. Note that making the second copy and deleting the first copy can be part of a move operation that has been integrated with the installation process. In addition, the copying, registering and deleting can involve using logic built into the application execution environment program itself.

Figure 3A:
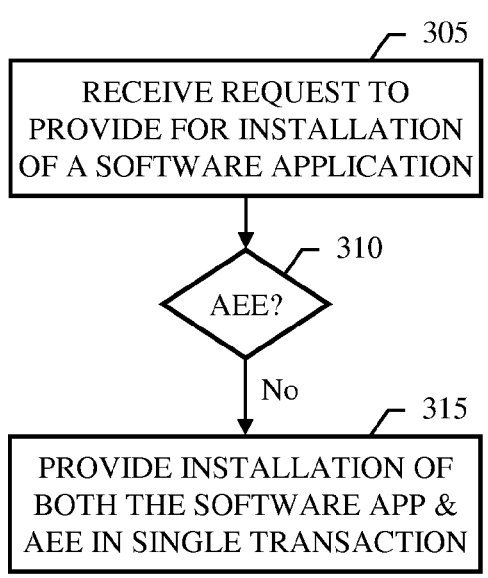
FIG. 3A shows an example process of installing an application execution environment and software application.

FIG. 3A shows an example process of installing an application execution environment and software application. A request can be received 305 to provide for installation of a software application, which requires for operation an application execution environment program (note that more than one may fill this requirement, since multiple different application execution environments may be able to provide the necessary support). A check can be made 310 to determine if the application execution environment program is already present on the target computer. Various approaches can be used to determine whether the application execution environment program is already present on the target computer. For example, functionality built into the web browser and the page being viewed can be employed to determine if the application execution environment program is already present on the target computer. As another example, the user can download and run a small program that can perform the detection and report or download an additional file (e.g., an installer). As another example, when the application execution environment program is installed on a computer, it can install a browser plug-in, which can be detected by a displayed web page (e.g., using JavaScript), i.e., the absence of the plug-in would indicate the absence of the application execution environment program.

If the application execution environment program is not already installed on the computer, installation of both the software application and the application execution environment program can be provided 315 in an installation sequence. The installation sequence can include a user interface panel that includes a notification regarding the application execution environment program to be installed. In addition, the installation of the software application and the application execution environment program can be tied together as a single installation transaction, such that they succeed or fail together.

Figure 3B:
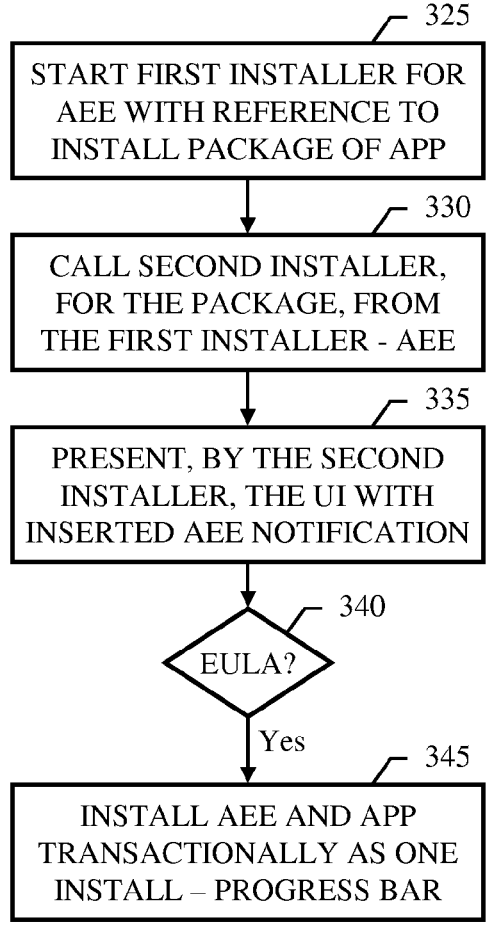
FIG. 3B shows an example process of installing an application execution environment and software application.

FIG. 3B shows an example process of installing an application execution environment and software application. Regardless of how received (e.g., on CD or by network download), a first installer of the application execution environment program can be started 325 with a reference to an installation package of the software application. The first installer can be designed to install the application execution environment program, but also be designed to accept an argument indicating a location of the installation package of the software application (e.g., a Universal Resource Locator, either to a local or a remote repository).

A second installer, for the installation package, can be called 330 from the first installer with an indication that the application execution environment program is to be installed. The second installer can be designed to install software applications that run on the application execution environment. The second installer can be part of an install/uninstall facility built into the application execution environment, as shown and described in connection with FIG. 4. Thus, the second installer can be part of the application execution environment itself, such that installing applications is one of the services the environment provides.

The second installer can present 335 a user interface that includes a notification regarding the application execution environment program to be installed along with the software application. This allows the user to be fully informed about the planned combined installation of the application and the underlying environment on which it runs, but this information is provided within the context of the installation sequence for the software application itself. Thus, the application execution environment program can be handled from the user's perspective like an element of the application (which cannot be unselected), even though it is a fully independent, separate software program that serves as a runtime environment for the software application.

Also, because the application execution environment is a separate software program, the installation sequence can also include a request for user acceptance 340 of an end user license agreement (EULA) for the application execution environment program. If the user acceptance is received, the application execution environment program and then the software program can be installed 345, transactionally as one install using an install progress bar that spans the two installs.

Figure 4:
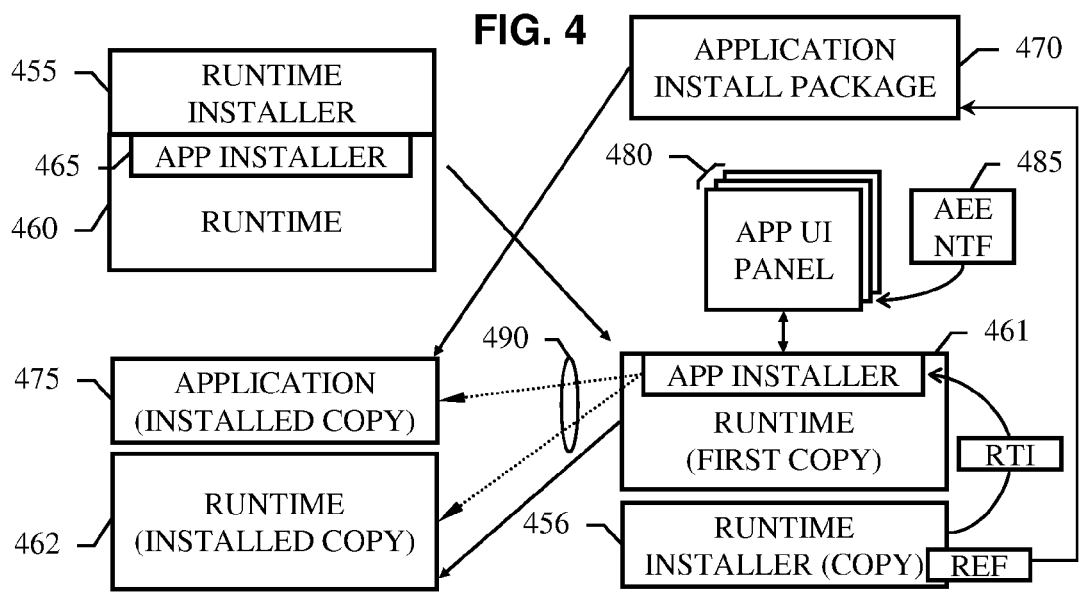
FIG. 4 shows example components that can be used when installing an application execution environment and a software application.

FIG. 4 shows example components that can be used when installing an application execution environment and a software application. An installer package for a runtime can include a runtime installer 455 and the runtime 460, such as described above. In addition, the runtime 460 can include an application installer 465 used to install applications that run on the runtime. When copied to the target computer, the installer package can create a local copy 456 of the runtime installer that can be called with a reference (REF) to an application install package 470 (which can be local or remote) and can extract a first copy 461 of the runtime (an x-copy of the runtime that will run in place at the temporary location on the computer). The local copy 456 of the runtime installer can then call into the application installer in the first runtime copy 461, with the reference and with an indication/instruction to also perform runtime installation (RTI) (e.g., a flag indicating that the runtime should also be installed). The application installer in the first runtime copy 461 can present user interface panels 480, at least one of which has an inserted notification 485 regarding the runtime to also be installed. Furthermore, an initial installation user interface panel of panels 480, presented by the application installer, can be one that relates to the software application, thus making clear to the user that the primary objective is the installation of the software application; the runtime installation is presented an ancillary process.

The application installer in the first runtime copy 461 (e.g., ActionScript code that uses native code built into the runtime) can then drive installation of the software application, and the runtime on which it depends, transactionally as one install 490; if either installation fails (or is cancelled), the entire combined installation is rolled back and undone. An installed copy 462 of the runtime can be created from the first runtime copy 461 and registered on the target computer. Then an installed copy of the application 475 can be created from the application install package 470. Finally, the first runtime copy 461 and the runtime installer copy 456 can be deleted from the target computer, or otherwise transitioned to a new state (e.g., they can be moved and converted into an uninstaller for the application 475 and the runtime 462). Thus, the runtime can provide both an execution environment for applications, and a installation/uninstallation environment for applications and itself.

FIGS. 5A-5E show example user interface panels that can be used when installing an application execution environment and a software application. A web browser window 500 shows an example website where an MPEG (Motion Picture Experts Group) audio player application can be downloaded. This audio player application relies on a runtime (e.g., the Adobe® AIR™ software) to operate on a given computer. A panel 505 includes a note 510 regarding the necessary runtime, and a download link 515 to cause downloading of the installer for the runtime.

The download link 515 can include a SWF badge that uses an API of the Flash® Player to detect whether or not the runtime is already installed on the local computer. The SWF badge (the SWF running in the web page) can check for the runtime when the SWF badge is displayed in the page. Then, when the user clicks on the SWF badge, it does different things depending on whether or not the runtime is already installed. If the runtime is installed on the local computer, the SWF badge can invoke the runtime directly to handle the installation of the audio player application. If the runtime is not installed on the local computer, the SWF badge can proceed to download the installer for the runtime and send a Universal Resource Locator (URL) for the audio player application for the installer to use upon starting. The URL can be sent by the SWF badge in a message via an interapplication communication (IAC) mechanism, such as LocalConnection (which operates using a shared memory segment) or another IAC mechanism. The IAC mechanism employed can be supported by both the web browser (or a plug-in thereto) and the application execution environment.

When a user clicks on the link 515, this can result in downloading an installation package, as described above, along with appropriate notifications and user authorizations. For example, the link 515 can result in the installation package being saved to the local computer for later use, or the link 515 can cause the installer to be downloaded and run immediately (e.g. if the installation package is the installer executable with embedded runtime, as described above). In addition, user authorization for the initial download of the runtime can also be obtained through a user interface presented and controlled by the web browser.

Figure 5A:
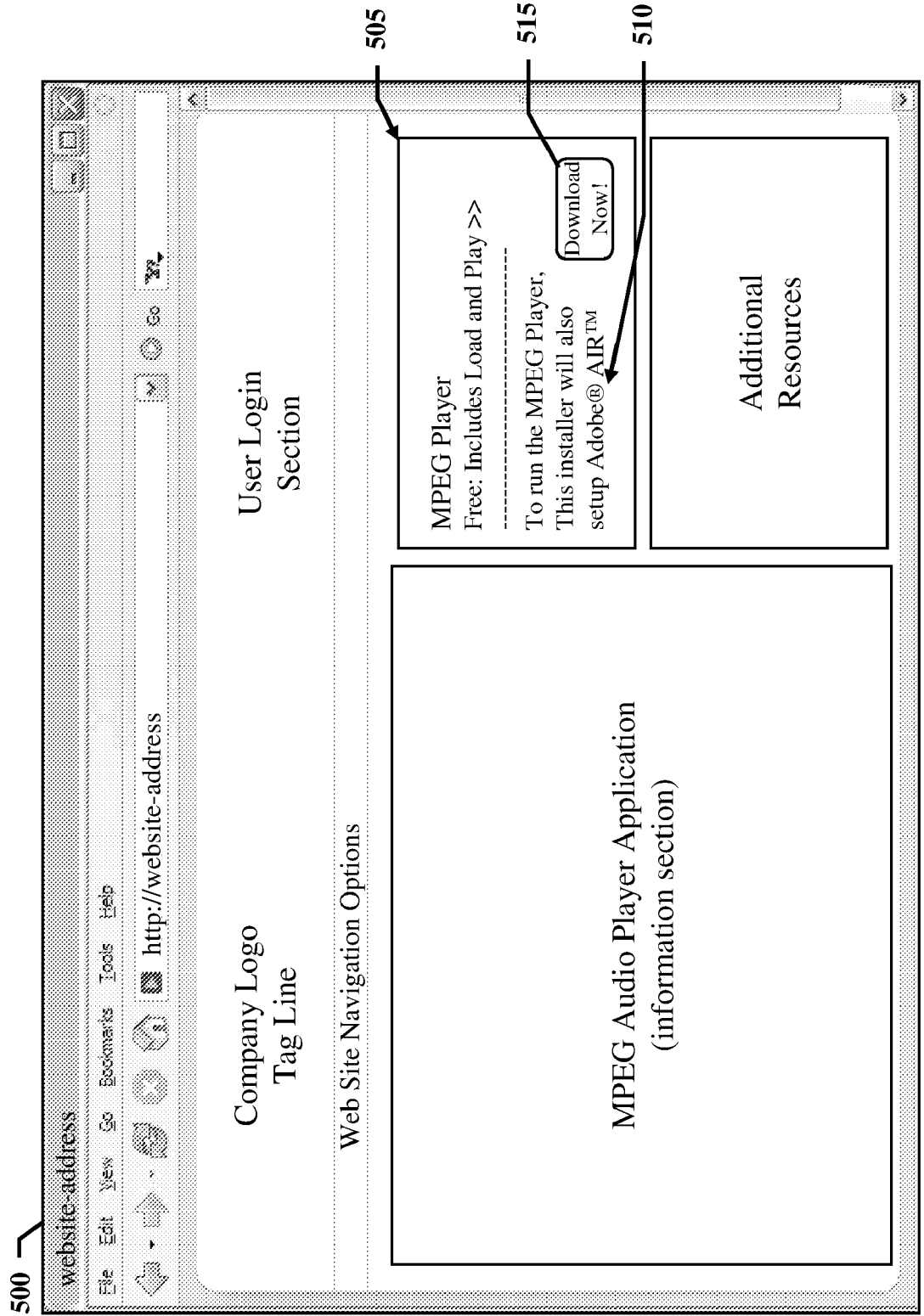
FIGS. 5A-5E show example user interface panels that can be used when installing an application execution environment and a software application.
Figure 5B:
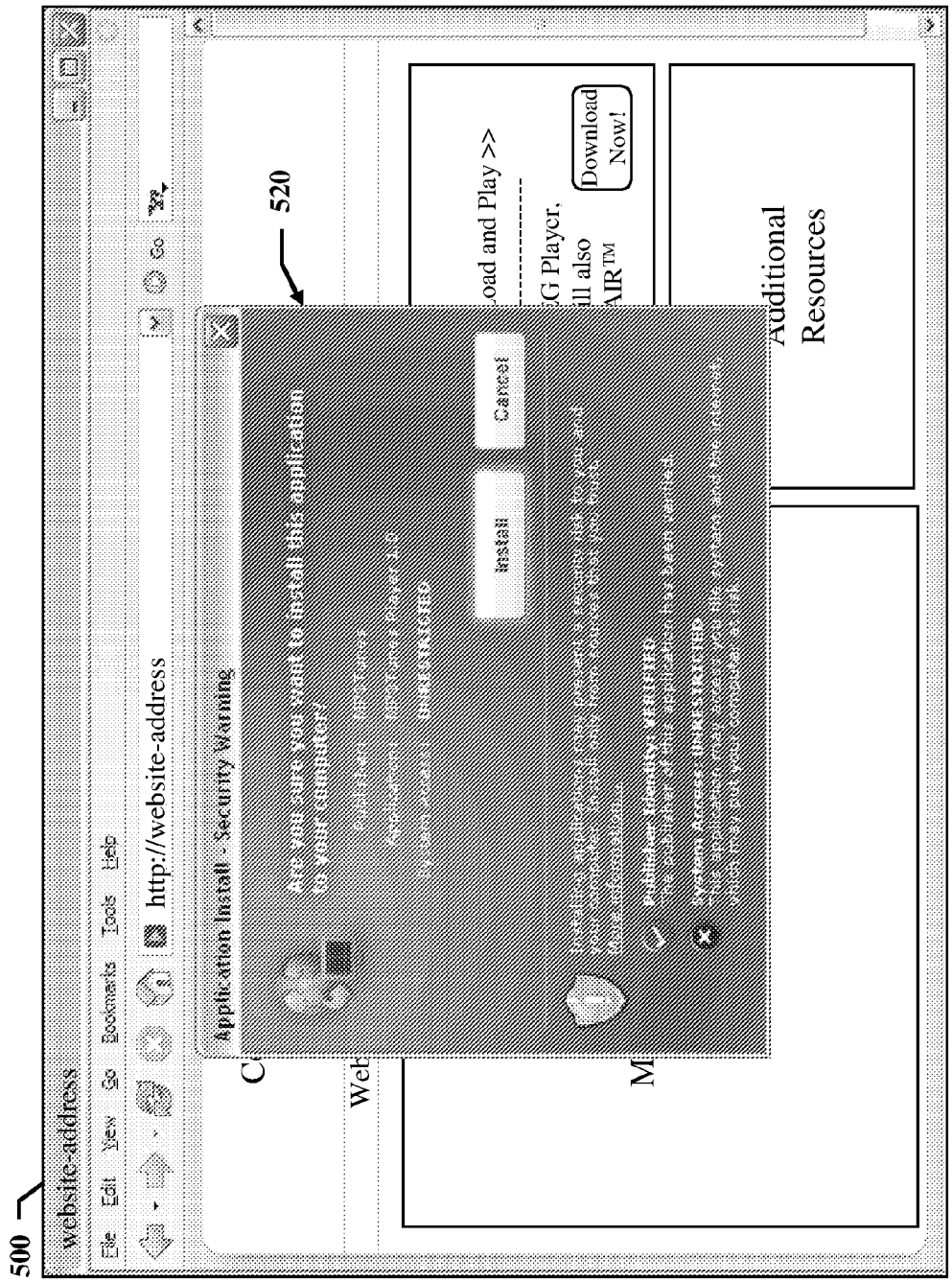

The installer for the runtime can be instructed to install both itself and the audio player application. Once the runtime installer begins running on the target computer, the user interface presented can be that of the application install. For example, the runtime installer can call the application installer, for the audio player application, along with an indication that the runtime is to be installed also. The first panel presented to the user can thus be an application install panel 520, as shown in FIG. 5B, which shows details of the application to be installed, and requested user confirmation that the install to proceed.

Figure 5C:
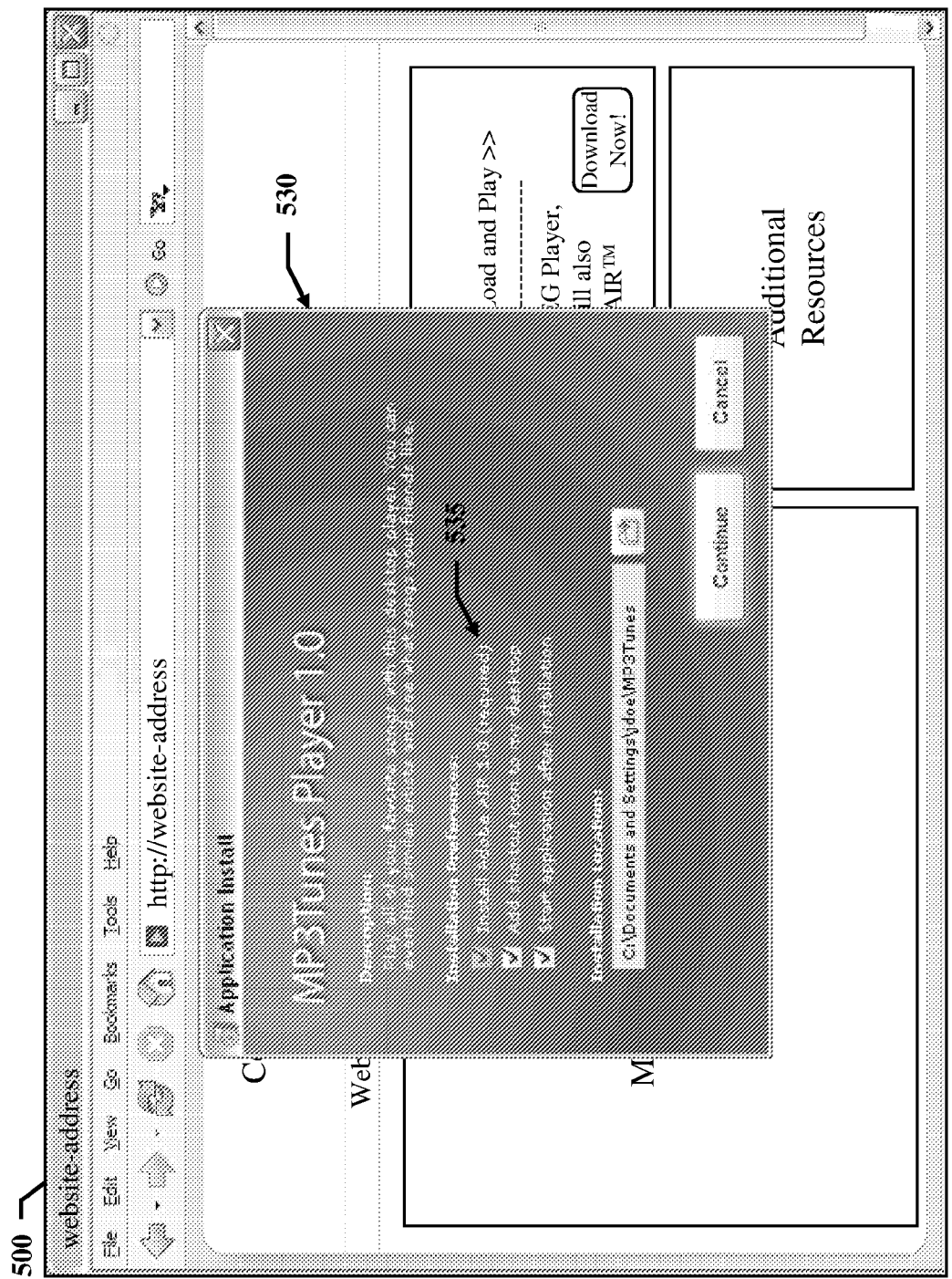
Figure 5D:
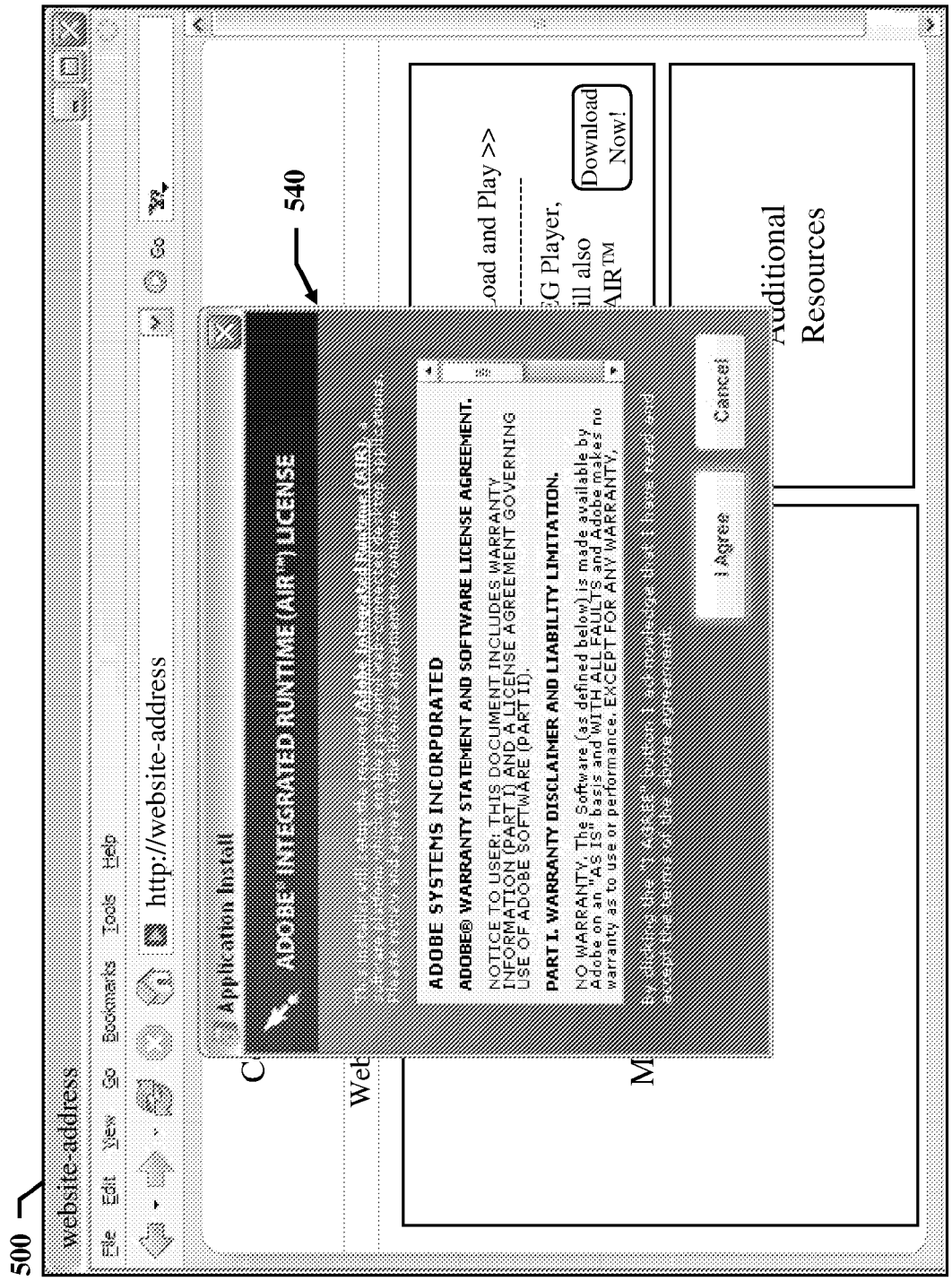

The application install UI can be rendered using the runtime that has been downloaded but not yet installed. The application install UI can be used to collect user preferences for the application (e.g., install location, whether to add a shortcut icon to the desktop, whether to start the application after installation, etc.). However, because the runtime is also to be installed, one or more additional items can be inserted into the application install UI to indicate that the runtime install will also happen. These inserted items can include notifications and user input requirements. For example, a second panel 530, as shown in FIG. 5C, can include a notification 535 regarding the runtime install. The notification 535 can be presented as an option that cannot be turned off (e.g., a grayed out check box as shown). When the user presses the continue button, a third panel 540 can be presented to obtain user acceptance of the end user license agreement for the runtime.

Figure 5E:
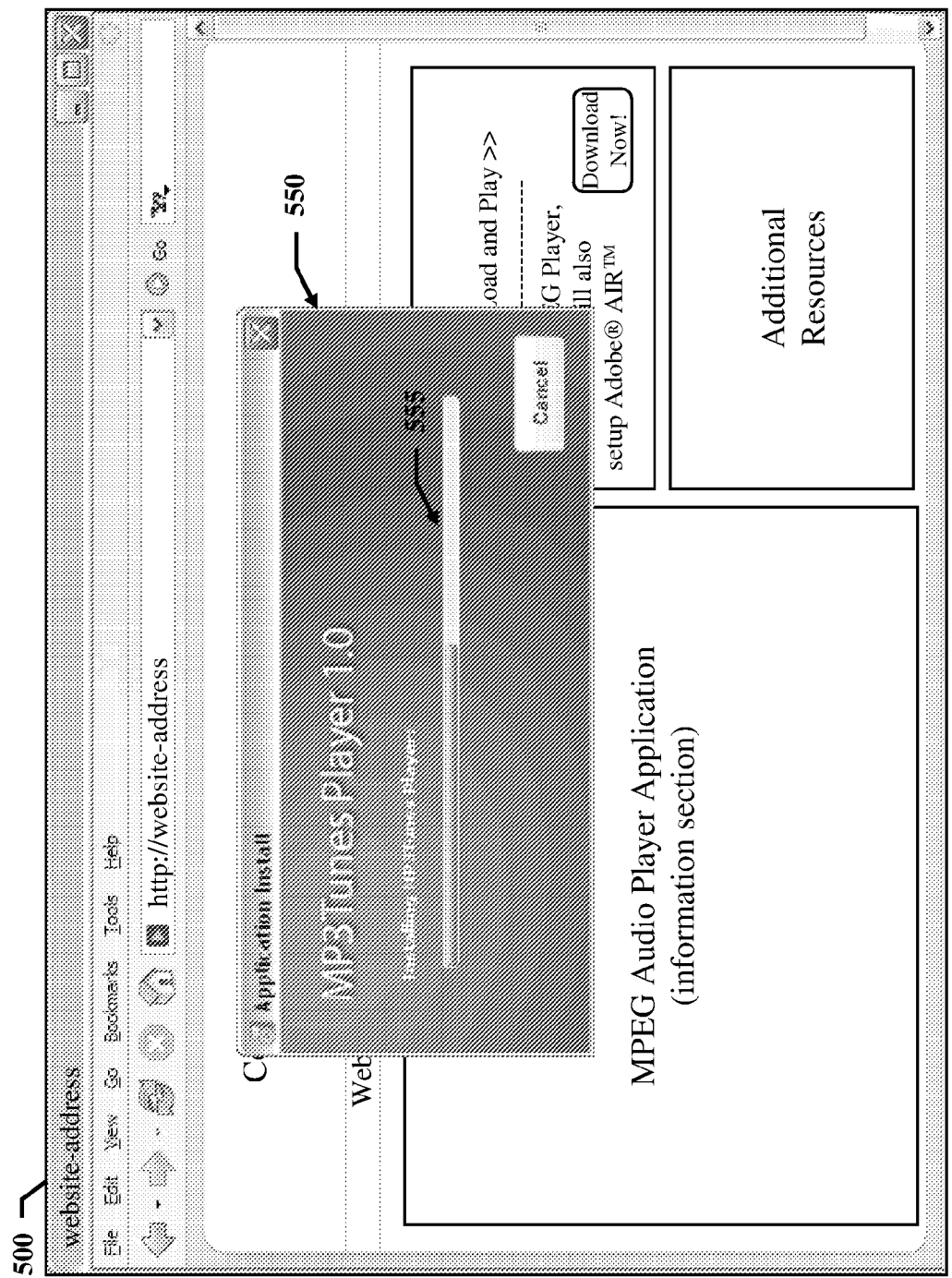

Once the user confirms the combined install, the installer can install the runtime and then the application. Both installations can be presented to the user interface as a single operation with combined progress updates. For example, an install progress panel 550, as shown in FIG. 5E, can include a progress bar 555 that spans the runtime installation and the application installation. Progress information from the runtime install can be sent back to the application install logic and displayed in the first fifty percent of the progress bar 555 shown.

When the runtime install completes, progress from the application install can be displayed in the second fifty percent of the progress bar 555 shown. When the application install completes, the application can then be run and used. Note also that the panels 520, 530, 540, 550 can all be presented in a single UI window used for the combined installation process.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Various mobile and other devices (e.g., having embedded operating systems) can also be supported.

What is claimed is:

1. A method comprising:
   receiving a request to provide for installation of a software application on a target computer, where the software application requires for operation an application execution environment program comprising a cross-platform application program interface to provide services to applications that run in the application execution environment; and
   providing installation of both the software application and the application execution environment program in an installation sequence when the target computer lacks the application execution environment program;
   wherein the installation of the software application and the application execution environment program are tied together as a single installation transaction, such that they succeed or fail together.

2. The method of claim 1, wherein the providing comprises providing an initial installation user interface panel relating to the software application upon first initiation of the installation sequence.

3. The method of claim 1, wherein the installation sequence comprises a user interface panel, presented to a user, that includes a notification regarding the application execution environment program to be installed along with the software application.

4. The method of claim 3, wherein the providing comprises providing the user interface panel for presentation to the user and collection of install preferences for the software application installation, wherein the notification comprises an indication that the application execution environment program installation is required for the software application installation.

5. The method of claim 3, wherein the installation sequence comprises:
   an installation user interface panel to receive confirmation that the user wants to install the software application;
   the user interface panel that includes the notification regarding the application execution environment program to be installed along with the software application;
   a license agreement user interface panel to receive acceptance of a user license agreement for the application execution environment program; and
   an install process user interface panel to present progress of the installation of both the software application and the application execution environment program using a single progress indicator that spans the installation of both the software application and the application execution environment program.

6. The method of claim 3, wherein the providing comprises:
   starting a first installer of the application execution environment program with a reference to an installation package of the software application;
   calling a second installer, for the installation package, from the first installer with an indication that the application execution environment program is to be installed;
   presenting, by the second installer, the user interface that includes the inserted notification; and
   after user acceptance of the license agreement for the application execution environment program, installing the application execution environment program and then the software program.

7. The method of claim 6, wherein the installing comprises the second installer driving the application execution environment program then the software program installs transactionally as one install using an install progress bar that spans the installs.

8. The method of claim 1, wherein the providing comprises:
   providing an installer package, comprising the application execution environment program and an installer, to the target computer to install the application execution environment program and the software application by running the installer in the application execution environment copied to the target computer.

9. A computer program product, encoded on a non-transitory computer-readable medium, operable to cause data processing apparatus to perform operations comprising:
receiving a request to provide for installation of a software application on a target computer, where the software application requires for operation an application execution environment program comprising a cross-platform application program interface to provide services to applications that run in the application execution environment; and
providing installation of both the software application and the application execution environment program in an installation sequence when the target computer lacks the application execution environment program;
wherein the installation of the software application and the application execution environment program are tied together as a single installation transaction, such that they succeed or fail together.

10. The product of claim 9, wherein the providing comprises providing an initial installation user interface panel relating to the software application upon first initiation of the installation sequence.

11. The product of claim 9, wherein the installation sequence comprises a user interface panel, presented to a user, that includes a notification regarding the application execution environment program to be installed along with the software application.

12. The product of claim 11, wherein the providing comprises providing the user interface panel for presentation to the user and collection of install preferences for the software application installation, wherein the notification comprises an indication that the application execution environment program installation is required for the software application installation.

13. The product of claim 11, wherein the installation sequence comprises:
an installation user interface panel to receive confirmation that the user wants to install the software application;
the user interface panel that includes the notification regarding the application execution environment program to be installed along with the software application;
a license agreement user interface panel to receive acceptance of a user license agreement for the application execution environment program; and
an install process user interface panel to present progress of the installation of both the software application and the application execution environment program using a single progress indicator that spans the installation of both the software application and the application execution environment program.

14. The product of claim 11, wherein the providing comprises:
starting a first installer of the application execution environment program with a reference to an installation package of the software application;
calling a second installer, for the installation package, from the first installer with an indication that the application execution environment program is to be installed;
presenting, by the second installer, the user interface that includes the inserted notification; and
after user acceptance of the license agreement for the application execution environment program, installing the application execution environment program and then the software program.

15. The product of claim 14, wherein the installing comprises the second installer driving the application execution environment program then the software program installs transactionally as one install using an install progress bar that spans the installs.

16. The product of claim 9, wherein the providing comprises:
providing an installer package, comprising the application execution environment program and an installer, to the target computer to install the application execution environment program and the software application by running the installer in the application execution environment copied to the target computer.

17. A system comprising:
a target computer; and
one or more computers operable to interact with the target computer and to perform operations comprising:
receiving a request to provide for installation of a software application on the target computer, where the software application requires for operation an application execution environment program comprising a cross-platform application program interface to provide services to applications that run in the application execution environment; and
providing installation of both the software application and the application execution environment program in an installation sequence when the target computer lacks the application execution environment program;
wherein the installation of the software application and the application execution environment program are tied together as a single installation transaction, such that they succeed or fail together.

18. The system of claim 17, wherein the providing comprises providing an initial installation user interface panel relating to the software application upon first initiation of the installation sequence.

19. The system of claim 17, wherein the installation sequence comprises a user interface panel, presented to a user, that includes a notification regarding the application execution environment program to be installed along with the software application.

20. The system of claim 19, wherein the providing comprises providing the user interface panel for presentation to the user and collection of install preferences for the software application installation, wherein the notification comprises an indication that the application execution environment program installation is required for the software application installation.

21. The system of claim 19, wherein the installation sequence comprises:
an installation user interface panel to receive confirmation that the user wants to install the software application;
the user interface panel that includes the notification regarding the application execution environment program to be installed along with the software application;
a license agreement user interface panel to receive acceptance of a user license agreement for the application execution environment program; and
an install process user interface panel to present progress of the installation of both the software application and the application execution environment program using a single progress indicator that spans the installation of both the software application and the application execution environment program.

22. The system of claim 19, wherein the providing comprises:

starting a first installer of the application execution environment program with a reference to an installation package of the software application;

calling a second installer, for the installation package, from the first installer with an indication that the application execution environment program is to be installed;

presenting, by the second installer, the user interface that includes the inserted notification; and after user acceptance of the license agreement for the application execution environment program, installing the application execution environment program and then the software program.

23. The system of claim 22, wherein the installing comprises the second installer driving the application execution environment program then the software program installs transactionally as one install using an install progress bar that spans the installs.

24. The system of claim 17, wherein the providing comprises:

providing an installer package, comprising the application execution environment program and an installer, to the target computer to install the application execution environment program and the software application by running the installer in the application execution environment copied to the target computer.

25. The system of claim 17, wherein the one or more computers comprise a server operable to interact with the target computer through a data communication network, and the target computer is operable to interact with the server as a client.

26. The system of claim 25, wherein the target computer comprises a personal computer running a web browser or a mobile communication device running a wireless application protocol browser.

* * * * *